Patented Mar. 1, 1949

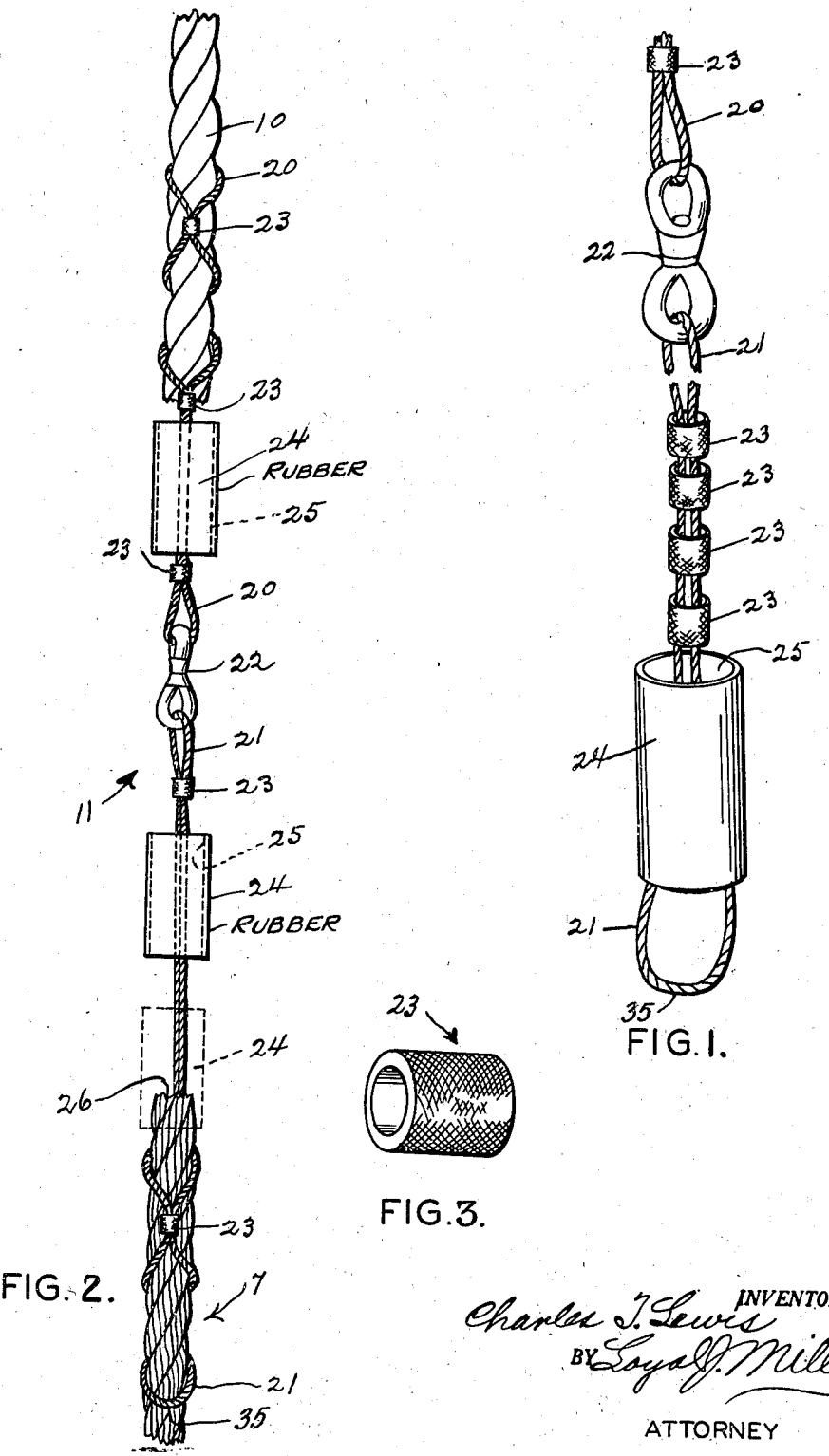

2,463,116

UNITED STATES PATENT OFFICE 2,463,116

CABLE CONNECTOR

Charles T. Lewis, Oklahoma City, Okla.

Application March 15, 1945, Serial No. 582,888

4 Claims. (Cl. 24—123)

My invention relates to apparatus for temporarily connecting two wire lines, heavy ropes, and the like, in end to end relation, so that the second line of the two will follow the first, and may be drawn through crown-block and/or traveling-block pulleys, upon which the first line has been previously installed.

In many types of equipment, such as cranes, in which heavy lines are used, the original installation of the line is a considerable problem. It is a common practice in such equipment, to first "string up" a light weight fiber rope. The rope has one of its ends mounted upon a power-driven rope-drum, and its other end is threaded through the various sheaves upon which it is desired to install the heavy line. After the light weight line has been properly "strung up," its free end is attached to one end of the heavy line, and the rope-drum is then used to draw the heavy line into place over the various sheaves.

In making the connection of the adjacent ends of the two lines, it is necessary that the connecting means be capable of traveling through the sheaves and blocks without itself becoming fouled, and without permitting the leading end of the following line to become fouled.

It is therefore an object of the present invention, to provide a line connecting means which is sufficiently flexible to travel over rope sheaves, and which at the same time, is small enough to envelop the line and yet pass between the peripheries of the sheaves and their supporting blocks, or the like.

In installing a new line in place of an old one which has worn out, one end of the new line is connected to the free end of the old line, and the new line is then drawn into place by the drum to which the old line is connected. This free end of the old line is frequently ravelled.

It is therefore an object of the present invention, to provide a line connector which may readily be installed upon and removed from the frayed ends of the heavy wire cable.

Another object of the invention is to provide a heavy line connector which is comparatively cheap to manufacture.

A further object is to provide a line connector which may be operatively installed upon and be disconnected from the lines manually, and without the use of any hand tools.

A still further object is to provide a line connector in which there are few moving parts to become worn or get out of order.

Other objects will be apparent from the following description when taken in conjunction with the accompanying single sheet of drawings, wherein:

Figure 1 is a perspective view of the device;

Figure 2 is a perspective view showing the device operatively installed between adjacent ends of two lines; and, Figure 3 is a perspective view of a tubular sleeve, a plurality of which form a part of the invention.

Like characters of reference designate like parts in all the figures wherein they occur.

In the drawings:

The invention per se, is indicated, as a whole, by the reference numeral 11, and is designed for the purpose of temporarily attaching adjacent ends of two lines 7 and 10, so that the drilling line 7 may be drawn over various sheaves of a derrick crown-block.

In carrying out the invention, the following described elements are provided:

Two endless loops 20 and 21 of small diametered soft laid rope or cable are attached together by a suitable and conventional swivel 22. Each of the loops 20 and 21 is provided with a desired plurality of exteriorly knurled tubular ferrules 23, which are preferably made of case-hardened high tensile metal. The ferrules 23 each envelop both sides or strands of the loop with which they are associated, and are freely slidable along the loop.

Each of the loops 20 and 21 are further provided with a resilient or elastic sleeve 24 which is preferably of rubber. The sleeves 24 have a through bore 25 which is of sufficient diameter to envelop the ends of the respective lines 7 or 10, as will be more fully described hereinbelow.

In operatively installing the device 11 upon the end portion of one of the lines 7 or 10, the sleeves 23 are all slid toward the swivel 22, and the resilient sleeve 24 is placed over the swivel in order to get it out of the way of the person making the installation. The loop 20 or 21, which is to be the first to be installed, is stretched out at full length from the swivel 22, in the position in which the loop 21 is shown in Fig. 1.

The end portion 35 of the loop 21 will then be placed around the end portion of the line 7 at a point lying some three or four feet from the extreme end 26 of the line. The ferrule 23, lying most adjacent the line 7, will then be slid along the loop until it resides as nearly as possible to the exterior surface of the line. The two strands or sides of the loop are then each brought past each side of the line, and another ferrule is slid toward the line until it rests as nearly as possible to the line, and at the side of the line lying opposite the side where the first sleeve was placed. This operation is repeated until a desired number of the ferrules 23 have been placed along the opposite surfaces of the line. The result of the above described operation is a series of small loops which closely envelope the line 7, each of the small loops lying between two of the most adjacent ferrules 23. When the installation as thus far described has been made, any end pull upon the loop 21 in an upward direction, as depicted in Fig. 2, will cause a contraction of the small loops about the line 7. The more pull thus exerted, the greater will be the frictional engagement of the small loops with the line 7.

After the last of the ferrules 23 have been installed along the line 7, the resilient sleeve 24 will be pushed into the dotted line position of Fig. 2, where it envelops the end of the line 7.

Installation of the loop 20 around the line 10 will be identical with that described above relative to the loop 21.

Obviously, the device may readily be disconnected from the lines 7 and 10, when end tension on the lines has been removed, by merely reversing the installation operation.

It is pointed out that when the device has been installed between adjacent ends of the two lines, the "cat-line" 10 may be used to draw the drilling line 7 over the crown-block sheaves in an obvious manner. Also, that the device will pass in its travel through the limited spaces in the crown-block without fouling with the cross-member 5 thereof, and the resilient sleeves 24 will prevent the ends of the lines 7 and 10 from so fouling.

In the accompanying drawings, and in the above description, the device has been shown and described as it is applicable to oil well drilling equipment. It is obvious, however, that the device will as efficiently serve in any industry, in which heavy lines must frequently be installed over sheaves which are more or less inaccessible due to their location above the ground.

Since structural changes could well be made in the device, without departing from the principle of the invention, I do not wish to be confined to the preferred embodiment as shown and described herein, further than I am limited by the scope of the appended claims.

I claim:

1. A device for coupling the adjacent ends of two axially separated lines, including: an endless loop of flexible material; a plurality of tubular ferrules enveloping both strands of said loop, and being slidable therealong; and resilient means carried by said loop for enveloping an end of one of said lines to prevent its fouling with a sheave.

2. A device for coupling the adjacent ends of two axially separated lines, including: an endless loop of flexible material; a plurality of tubular ferrules, each ferrule enveloping both strands of said loop, and being slidable therealong; and means carried by said loop for enveloping an end of one of said lines to prevent its fouling with a sheave, said means including a tubular sleeve of resilient material enveloping both strands of said loop, and being slidable with relation thereto.

3. A clasp for frictionally engaging the ends of two axially spaced cables, including: an endless loop of flexible line having co-extensive side strands; a plurality of tubular ferrules slidably surrounding both side strands of said loop; a second endless loop of flexible line having co-extensive side strands; a plurality of tubular ferrules slidably surrounding both side strands of said second loop; and a swivel connecting the adjacent end portions of said loops.

4. Structure as specified in claim 3, and: a resilient sleeve slidably surrounding the side strands of one loop for covering the end of one cable; and a resilient sleeve slidably surrounding the side strands of the other loop for covering the end of the other cable.

CHARLES T. LEWIS.

REFERENCES CITED

The following references are of record in the file of this patent:

UNITED STATES PATENTS

| Number | Name | Date |
| --- | --- | --- |
| 363,352 | Avery | May 24, 1887 |
| 457,797 | Shilling, Jr. | Aug. 18, 1891 |
| 496,696 | Nash | May 2, 1893 |
| 723,339 | Tolman | Mar. 24, 1903 |
| 917,718 | Derby | Apr. 6, 1909 |
| 1,197,322 | Wolf | Sept. 5, 1916 |
| 1,360,189 | Cushing | Nov. 23, 1920 |
| 1,581,575 | Henderson | Apr. 20, 1926 |
| 2,110,408 | Tallman | Mar. 8, 1938 |

FOREIGN PATENTS

| Number | Country | Date |
| --- | --- | --- |
| 116,484 | Australia | July 9, 1941 |